United States Patent [19]

Okamoto et al.

[11] Patent Number: 5,179,137
[45] Date of Patent: Jan. 12, 1993

[54] HEAT-RESISTANT HIGH-IMPACT POLYSTYRENE COMPOSITION

[75] Inventors: Yasushi Okamoto; Tetsuo Uno, both of Chiba, Japan

[73] Assignee: Sumitomo Chemical Co., Ltd., Osaka, Japan

[21] Appl. No.: 624,380

[22] Filed: Dec. 7, 1990

[30] Foreign Application Priority Data

Dec. 8, 1989 [JP] Japan ................................. 1-320240

[51] Int. Cl.$^5$ .............................................. C08K 9/06
[52] U.S. Cl. .................... 523/213; 523/214; 524/394; 524/575
[58] Field of Search ............... 524/394, 575, 577; 525/241; 523/213, 214

[56] References Cited

FOREIGN PATENT DOCUMENTS

| | | | |
|---|---|---|---|
| 556033 | 4/1958 | Canada ................................. | 525/241 |
| 48388 | 3/1982 | European Pat. Off. . | |
| 272114 | 6/1988 | European Pat. Off. . | |
| 2505701 | 9/1975 | Fed. Rep. of Germany . | |
| 51-026955 | 3/1976 | Japan ................................. | 525/241 |
| 56-062946 | 5/1980 | Japan ................................. | 524/577 |
| 55-062946 | 9/1981 | Japan . | |
| 56-118452 | 9/1981 | Japan . | |
| 59-86649 | 5/1984 | Japan . | |

*Primary Examiner*—John C. Bleutge
*Assistant Examiner*—Mark Sweet
*Attorney, Agent, or Firm*—Sughrue, Mion, Zinn Macpeak & Seas

[57] ABSTRACT

A heat-resistant, high-impact polystyrene composition is disclosed, comprising:
(A) 100 parts by weight of high-impact polystyrene,
(B) from 1.5 to 5 parts by weight of glass fibers,
(C) from 2.5 to 10 parts by weight of a styrene-butadiene-styrene copolymer, and
(D) from 0.05 to 5 parts by weight of a metal salt of a higher fatty acid, the high-impact polystyrene (A) having a polybutadiene content of from 4.5 to 8.0% by weight and an average rubber particle diameter of from 0.5 to 2.0 μm and containing no plasticizer;

the glass fibers (B) having an average fiber length of from 0.5 to 2 mm and an average aspect ratio of 20 or more and having undergone surface treatment with a silane coupling agent; and the styrene-butadiene-styrene copolymer (C) having a butadiene unit content of from 40 to 80% by weight.

4 Claims, No Drawings

HEAT-RESISTANT HIGH-IMPACT POLYSTYRENE COMPOSITION

FIELD OF THE INVENTION

The present invention relates to a polystyrene composition which has good appearance, high heat resistance, and high impact strength and which can be used extensively for applications to, for example, housings of copying machines or office automation (OA) apparatus and interior automotive trim materials.

BACKGROUND OF THE INVENTION

Materials for housings of copying machine, OA apparatus, etc. and for interior automotive trims are required to have good appearance and high heat resistance and high impact resistance. As such materials, ABS resins and modified polyphenylene ether (hereinafter abbreviated as modified PPE) resins are being generally used.

ABS resins and modified PPE resins are expensive as compared with high-impact polystyrene (hereinafter abbreviated as HIPS) and, hence, there is a desire, in the industries, for a less expensive resin material in order to attain cost reduction.

Incorporation of glass fibers into HIPS which is less expensive than ABS and modified PPE has conventionally been practiced for the purpose of improving heat resistance. However, since the incorporation of glass fibers generally impairs the appearance and impact strength of the HIPS, the glass fiber-incorporated HIPS cannot be used as housings of copying machines, OA apparatus, etc. or as interior automotive trim materials, to which the composition of the present invention can be advantageously applied.

SUMMARY OF THE INVENTION

Under these circumstances, the present inventors have made intensive studies in order to develop a composition containing HIPS as a main component and having improved appearance, heat resistance, and impact resistance. As a result, the present invention has been completed.

Accordingly, an object of the present invention is to provide a polystyrene composition which meets requirements is specified below.

The polystyrene composition of the present invention is a heat-resistant, high-impact polystyrene composition comprising:
(A) 100 parts by weight of high-impact polystyrene,
(B) from 1.5 to 5 parts by weight of glass fibers,
(C) from 2.5 to 10 parts by weight of a styrene-butadiene-styrene copolymer, and
(D) from 0.05 to 5 parts by weight of a metal salt of a higher fatty acid,
the high-impact polystyrene (A) having a polybutadiene content of from 4.5 to 8.0% by weight and an average rubber particle diameter of from 0.5 to 2.0 $\mu$m and containing no plasticizer (e.g., mineral oils, etc.);
the glass fibers (B) having an average fiber length of from 0.5 to 2 mm and an average aspect ratio of 20 or more and having undergone surface treatment with a silane coupling agent; and
the styrene-butadiene-styrene copolymer (C) having a butadiene unit content of from 40 to 80% by weight.

All of the above requirements are essential for attaining the object of the present invention.

DETAILED DESCRIPTION OF THE INVENTION

The HIPS to be employed in the composition of the present invention can be prepared by dissolving polybutadiene in a styrene monomer and subjecting the solution to bulk polymerization or bulk-suspension two-stage polymerization.

Either high-cis polybutadiene having a high cis form content or low-cis polybutadiene having a low cis form content can be used as the polybutadiene. However, the amount of the polybutadiene contained in the resulting HIPS should be from 4.5% to 8.0% by weight, in terms of the content of polybutadiene in the styrene monomer solution thereof to be polymerized.

If the amount of polybutadiene contained in HIPS is below 4.5% by weight, the HIPS cannot impart sufficient impact strength to the final composition. If it exceeds 8.0% by weight, the final composition not only shows insufficient heat resistance but has poor appearance.

The polybutadiene rubber present in the HIPS should have an average particle diameter of from 0.5 to 2.0 $\mu$m.

If the average rubber particle diameter of the HIPS used is below 0.5 $\mu$m, the final composition has insufficient impact strength although it has good appearance. If it exceeds 2.0 $\mu$m, the final composition has a poor appearance which is insufficient for practical use.

The HIPS should not contain plasticizers such as mineral oils and liquid paraffins. Use of HIPS containing a plasticizer is not preferable in that the final composition has impaired heat resistance.

The amount of glass fibers incorporated in the composition should be in the range of from 1.5 to 5 parts by weight per 100 parts by weight of the HIPS. If the amount of glass fibers incorporated is below 1.5 parts by weight, insufficient heat resistance results. If it exceeds 5 parts by weight, poor appearance results.

The glass fibers should have an average fiber length of 0.5 to 2 mm and an average aspect ratio of 20 or more.

If glass fibers with an average fiber length below 0.5 mm are used to produce a composition, sufficient heat resistance cannot be imparted to the final composition. Use of glass fibers having an average fiber length exceeding 2 mm results in poor appearance.

If glass fibers having an average aspect ratio below 20 are used, sufficient heat resistance cannot be obtained. The aspect ratio as referred to herein means a ratio defined by the equation:

Aspect Ratio $= l_i/d_i$ wherein $d_i$ is the diameter of glass fiber, and $l_i$ is the length of glass fiber.

Both average fiber length and average aspect ratio are determined by measuring, with an optical microscope or by other means, the diameters and lengths of about 100 glass fibers arbitrarily selected, and then calculating the respective arithmetic means.

The glass fibers to be used should further be ones which have been surface-treated with a silane coupling agent such as an aminosilane. Untreated glass fibers have poor adhesion to HIPS and cannot impart sufficient heat resistance and impact resistance to the final composition.

Usually, the surface treatment of glass fibers is carried out in such a manner that the glass fibers are dipped in an aqueous solution of a silane coupling agent such as an aminosilane or applied with a silane coupling agent or an aqueous solution thereof by spraying or other means, to thereby attach the silane coupling agent onto the glass fiber surfaces.

The amount of the styrene-butadiene-styrene copolymer (hereinafter abbreviated as SBS copolymer) incorporated in the composition should be from 2.5 to 10 parts by weight per 100 parts by weight of the HIPS. If the amount of the SBS copolymer incorporated is below 2.5 parts by weight, sufficient impact resistance cannot be imparted to the final composition. If it exceeds 10 parts by weight, sufficient heat resistance cannot be obtained.

The SBS copolymer to be employed in the composition of the present invention should have a butadiene unit content of from 40% to 80% by weight. If an SBS copolymer having a butadiene unit content below 40% by weight is used to prepare a composition, sufficient impact resistance cannot be imparted to the composition. On the other hand, if the butadiene unit content of the SBS copolymer exceeds 80% by weight, the final composition has impaired heat resistance.

The metal salt of higher fatty acid is incorporated in the composition in an amount of from 0.05 to 5 parts by weight per 100 parts by weight of the HIPS. Examples of higher fatty acid metal salts include calcium, magnesium, zinc, sodium, or aluminum salts of saturated fatty acids having 12 to 22 carbon atoms. Of these, calcium stearate, magnesium stearate, and zinc stearate are most preferably used.

These higher fatty acid metal salts may be used alone or in combination of two or more thereof. The incorporated amount thereof should be in the range of from 0.05 to 5 parts by weight per 100 parts by weight of the HIPS. If the incorporated amount of the higher fatty acid metal salt is below 0.05 part by weight, the resulting composition has reduced tensile elongation and shows poor mold-release properties in injection molding processes. If it exceeds 5 parts by weight, the resulting composition has impaired heat resistance.

The higher fatty acid metal salt is essential to the composition of the present invention, and the object of the invention cannot be accomplished if this essential component is replaced by any other lubricant such as stearic acid amide and polyethylene wax, because other lubricants impair the tensile elongation of the composition.

Generally employed antistatic agents, antioxidants, pigments, fillers, etc. may be added to the polystyrene composition of the present invention as long as such additives used do not inhibit the effects of the present invention.

The composition of the present invention may be produced by weighing predetermined amounts of the constitutional ingredients, i.e., the HIPS, glass fibers, SBS copolymer, and higher fatty acid metal salt, and granulating them in an ordinary extruder to into pellets which are then provided for the use. Alternatively, the composition may be produced by simultaneously dry-blending predetermined amounts of the constituent ingredients and directly feeding the blend to a hopper of an injection molding machine. Thus, molded articles having good appearance, high heat resistance, and high impact resistance, which the present invention is intended to provide, can be obtained.

The resin composition of the present invention has good appearance, high heat resistance, and high impact strength and, hence, is suited for use as a molding material for producing housings of copying machines and OA apparatus and interior automotive trim parts.

The present invention will be explained below in more detail by reference to the following Examples and Comparative Examples, but the Examples should not be construed to be limiting the scope of the invention.

EXAMPLES 1 TO 7 AND COMPARATIVE EXAMPLES 1 TO 16

(1) Raw Materials Used (A) HIPS:

The HIPS used is one produced by the ordinary bulk-suspension polymerization process using a 20-liter autoclave.

(B) Glass fiber (GF):

Four kinds of glass fibers available from two manufacturers given below were used.

| Manufacturer | Trade Name | GF Length | GF Diameter | Aspect Ratio |
|---|---|---|---|---|
| Nippon Electric Glass Co., Ltd. | ESC 015T-321 | 1.5 mm | 13 μm | 115 |
| Fuji Fiber Glass Co., Ltd. | FESS 015-404 | 0.5 mm | 11 μm | 45 |
| | FESS 010-404 | 0.3 mm | 11 μm | 27 |
| | FESS 005-404 | 0.1 mm | 11 μm | 9 |

(C) SBS copolymer:

The SBS copolymer used is one produced from styrene and butadiene by a living polymerization process using an alkyl-lithium as a catalyst.

(D) Higher fatty acid metal salt:

Commercially available calcium stearate (Ca-st) and zinc stearate (Zn-st) were used.

(2) Method of Measurement of Physical Properties (A) Preparation of Specimen:

In accordance with ASTM D638, Type I test specimens were prepared by injection molding, and the specimens were subjected to measurement after being conditioned for 24 hours in a conditioning room having a temperature of 23° C. and a relative humidity of 50%.

(B) Heat resistance:

Heat resistance was evaluated at a load of 18.6 kg/cm$^2$ in accordance with JIS K7207.

(C) Izod impact strength:

Measurements were made on ¼-inch notched specimens at 23° C. in accordance with ASTM D256.

(D) Appearance of molded article:

The surfaces of molded articles produced by injection molding were visually evaluated, in which articles having a markedly roughened surface due to GF were judged to be poor, while articles without such conspicuously roughened surface were judged to be good.

(E) Tensile elongation:

Tensile test was conducted in accordance with JIS K7113, and the tensile elongation of a 50-mm section marked in the middle of the specimen was calculated using the following equation:

$$\text{Tensile Elongation} (\%) = [(l_1 - l_0)/l_0] \times 100$$

wherein $l_1$ is the elongation at break (mm), and $l_0$ is the length of the marked section (50 mm).

(3) Preparation of Polystyrene Compositions

According to the formulations shown in Tables 1 to 3 for the respective Examples and Comparative Examples, the ingredients for each composition were dry-blended and granulated in a 40-mm$\phi$ single-screw extruder into pellets which were then formed into test specimens for mearuement of physical properties by means of a 150-ton injection molding machine.

The results obtained are summarized in Tables 1 to 3.

TABLE 1

|  | Example 1 | Example 2 | Example 3 | Example 4 | Example 5 | Example 6 | Example 7 |
|---|---|---|---|---|---|---|---|
| HIPS (parts by weight) | 100 | 100 | 100 | 100 | 100 | 100 | 100 |
| GF (parts by weight) | 2.5 | 2.5 | 5.0 | 1.5 | 2.5 | 2.5 | 5.0 |
| SBS copolymer (parts by weight) | 5.0 | 5.0 | 2.5 | 10.0 | 5.0 | 5.0 | 5.0 |
| Higher fatty acid metal salt (parts by weight) | Ca-st 0.2 | Zn-st 0.2 | Ca-st 0.1 | Ca-st 0.2 | Ca-st 0.2 | Ca-st 0.2 | Ca-st 0.5 |
| Polybutadiene content in HIPS (wt %) | 6.0 | 6.0 | 8.0 | 4.5 | 6.0 | 6.0 | 8.0 |
| Rubber particle diameter ($\mu$m) | 1.6 | 1.6 | 1.8 | 0.8 | 1.6 | 1.6 | 1.8 |
| Plasticizer | none | none | none | none | none | none | none |
| GF average fiber length (mm) | 1.5 | 0.5 | 1.5 | 1.5 | 1.5 | 1.5 | 1.5 |
| GF aspect ratio | 115 | 45 | 115 | 115 | 115 | 115 | 115 |
| Treatment with silane coupling agent | done | done | done | done | done | done | done |
| Butadiene unit content in SBS (wt %) | 60 | 60 | 60 | 60 | 80 | 40 | 60 |
| Heat resistance (DHT) (°C.) | 93 | 92 | 94 | 90 | 90 | 91 | 93 |
| Izod impact strength (kg.cm/cm) | 8 | 8 | 7 | 8 | 8 | 7 | 8 |
| Tensile elongation (%) | 40 | 42 | 34 | 40 | 45 | 38 | 30 |
| Appearance | good | good | good | good | good | good | good |

TABLE 2

|  | Comp. Example 1 | Comp. Example 2 | Comp. Example 3 | Comp. Example 4 | Comp. Example 5 | Comp. Example 6 | Comp. Example 7 | Comp. Example 8 | Comp. Example 9 |
|---|---|---|---|---|---|---|---|---|---|
| HIPS (parts by weight) | 100 | 100 | 100 | 100 | 100 | 100 | 100 | 100 | 100 |
| GF (parts by weight) | 5.0 | 5.0 | 0.5 | 7.5 | 2.5 | 2.5 | 2.5 | 2.5 | 2.5 |
| SBS copolymer (parts by weight) | 12.0 | 1.5 | 5.0 | 5.0 | 5.0 | 5.0 | 5.0 | 5.0 | 5.0 |
| Higher fatty acid metal salt (parts by weight) | Ca-st 0.2 | Ca-st 0.2 | Ca-st 0.2 | Ca-st 0.2 | Ca-st 0 | Ca-st 8 | Stearic acid amide 0.2 | Ca-st 0.2 | Ca-st 0.2 |
| Polybutadiene content in HIPS (wt %) | 6.0 | 6.0 | 6.0 | 6.0 | 6.0 | 6.0 | 6.0 | 8.0 | 8.0 |
| Rubber particle diameter ($\mu$m) | 1.6 | 1.6 | 1.6 | 1.6 | 1.6 | 1.6 | 1.6 | 2.5 | 0.2 |
| Plasticizer | none | none | none | none | none | none | none | added | added |
| GF average fiber length (mm) | 1.5 | 1.5 | 1.5 | 1.5 | 1.5 | 1.5 | 1.5 | 1.5 | 1.5 |
| GF aspect ratio | 115 | 115 | 115 | 115 | 115 | 115 | 115 | 115 | 115 |
| Treatment with silane coupling agent | done | done | done | done | done | done | done | done | done |
| Butadiene unit content in SBS (wt %) | 60 | 60 | 60 | 60 | 60 | 60 | 60 | 60 | 60 |
| Heat resistance (DHT) (°C.) | 84 | 94 | 84 | 94 | 93 | 86 | 93 | 86 | 85 |
| Izod impact strength (kg.cm/cm) | 9 | 5 | 8 | 5 | 8 | 8 | 8 | 8 | 6 |
| Tensile elongation (%) | 36 | 30 | 40 | 26 | 3 | 40 | 6 | 42 | 40 |
| Appearance | good | good | good | poor | good | good | good | poor | good |

TABLE 3

|  | Comp. Example 10 | Comp. Example 11 | Comp. Example 12 | Comp. Example 13 | Comp. Example 14 | Comp. Example 15 | Comp. Example 16 |
|---|---|---|---|---|---|---|---|
| HIPS (parts by weight) | 100 | 100 | 100 | 100 | 100 | 100 | 100 |
| GF (parts by weight) | 2.5 | 2.5 | 2.5 | 2.5 | 2.5 | 1.5 | 2.5 |
| SBS copolymer (parts by weight) | 5.0 | 5.0 | 5.0 | 5.0 | 5.0 | 5.0 | 5.0 |
| Higher fatty acid metal salt (parts by weight) | Ca-st 0.2 | Ca-st 0.2 | Ca-st 0.2 | Ca-st 0.2 | Ca-st 0.2 | Ca-st 0.2 | Ca-st 0.2 |
| Polybutadiene content in HIPS (wt %) | 6.0 | 6.0 | 6.0 | 6.0 | 6.0 | 9.0 | 3.5 |
| Rubber particle diameter | 1.6 | 1.6 | 1.6 | 1.6 | 1.6 | 1.8 | 1.6 |

TABLE 3-continued

|  | Comp. Example 10 | Comp. Example 11 | Comp. Example 12 | Comp. Example 13 | Comp. Example 14 | Comp. Example 15 | Comp. Example 16 |
| --- | --- | --- | --- | --- | --- | --- | --- |
| ($\mu$m) |  |  |  |  |  |  |  |
| Plasticizer | none | none | none | none | none | none | none |
| GF average fiber length (mm) | 0.3 | 0.5 | 0.1 | 1.5 | 1.5 | 1.5 | 1.5 |
| GF aspect ratio | 27 | 45 | 9 | 115 | 115 | 115 | 115 |
| Treatment with silane coupling agent | done | not done | done | done | done | done | done |
| Butadiene unit content in SBS (wt %) | 60 | 60 | 60 | 90 | 20 | 60 | 60 |
| Heat resistance (DHT) (°C.) | 86 | 87 | 84 | 86 | 90 | 87 | 92 |
| Izod impact strength (kg.cm/cm) | 8 | 6 | 8 | 8 | 6 | 8 | 6 |
| Tensile elongation (%) | 42 | 40 | 45 | 41 | 28 | 49 | 40 |
| Appearance | good | good | good | good | good | poor | good |

While the invention has been described in detail and with reference to specific embodiments thereof, it will be apparent to one skilled in the art that various changes and modifications can be made therein without departing from the spirit and scope thereof.

What is claimed is:

1. A heat-resistant, high-impact polystyrene composition comprising (A)–(D) in parts by weight:
   (A) 100 parts by weight of high-impact polystyrene,
   (B) from 1.5 to 5 parts by weight of glass fibers,
   (C) from 2.5 to 10 parts by weight of a styrene-butadiene-styrene copolymer, and
   (D) from 0.05 to 5 parts by weight of a metal salt of a higher fatty acid,
   the high-impact polystyrene (A) having a polybutadiene content of from 4.5 to 8.0% by weight based on the weight of the high-impact polystyrene and an average rubber particle diameter of from 0.5 to 2.0 $\mu$m and containing no plasticizer;
   the glass fibers (B) having an average fiber length of from 0.5 to 2 mm and an average aspect ratio of 20 or more and having undergone surface treatment with a silane coupling agent; and
   the styrene-butadiene-styrene copolymer (C) having a butadiene unit content of from 40 to 80% by weight based on the weight of the styrene-butadiene-styrene copolymer.

2. A composition as in claim 1, wherein the glass fibers (B) are those having undergone surface treatment with an aminosilane.

3. A composition as in claim 1, wherein said metal salt of higher fatty acid is a calcium, magnesium, zinc, sodium, or aluminum salt of a saturated fatty acid having from 12 to 22 carbon atoms.

4. A composition as in claim 1, wherein said metal salt of higher fatty acid is calcium stearate, magnesium stearate, or zinc stearate.

* * * * *